United States Patent
de Lescure et al.

(10) Patent No.: US 12,524,590 B2
(45) Date of Patent: Jan. 13, 2026

(54) SYNTHESIS OF A NETWORK-ON-CHIP (NoC) FOR INSERTION OF PIPELINE STAGES

(71) Applicant: ARTERIS, INC., Campbell, CA (US)

(72) Inventors: Benoit de Lescure, Campbell, CA (US); Moez Cherif, Santa Cruz, CA (US)

(73) Assignee: ARTERIS, INC., Campbell, CA (US)

( * ) Notice: Subject to any disclaimer, the term of this patent is extended or adjusted under 35 U.S.C. 154(b) by 664 days.

(21) Appl. No.: 17/949,193

(22) Filed: Sep. 20, 2022

(65) Prior Publication Data
US 2023/0105677 A1    Apr. 6, 2023

Related U.S. Application Data

(60) Provisional application No. 63/250,149, filed on Sep. 29, 2021.

(51) Int. Cl.
| G06F 30/30 | (2020.01) |
| G06F 30/327 | (2020.01) |
| G06F 30/392 | (2020.01) |
| G06F 111/04 | (2020.01) |
| G06F 115/02 | (2020.01) |

(52) U.S. Cl.
CPC .......... G06F 30/327 (2020.01); G06F 30/392 (2020.01); G06F 2111/04 (2020.01); G06F 2115/02 (2020.01)

(58) Field of Classification Search
CPC .. G06F 30/327; G06F 30/392; G06F 2111/04; G06F 2115/02; G06F 30/337; G06F 2117/10; G06F 2119/12; G06F 30/32
See application file for complete search history.

(56) References Cited

U.S. PATENT DOCUMENTS

| 5,485,396 A | 1/1996 | Brasen et al. |
| 5,541,849 A | 7/1996 | Rostoker et al. |
| 5,623,420 A | 4/1997 | Yee et al. |
| 5,638,288 A | 6/1997 | Deeley |

(Continued)

FOREIGN PATENT DOCUMENTS

| CN | 105187313 B | 5/2018 |
| CN | 109587081 A | 4/2019 |

(Continued)

OTHER PUBLICATIONS

Chaari Moomen Moomen Chaari@Infineon Com et al: "A model-based and simulation-assisted FMEDA approach for safety-relevant E/E systems", Proceedings of the 34th ACM SIGMOD-SIGACT-SIGAI Symposium on Principles of Database Systems, ACMPUB27, New York, NY, USA, Jun. 7, 2015 (Jun. 7, 2015), pp. 1-6, XP058511366, DOI: 10.1145/2744769.2747908 ISBN: 978-1-4503-3550-8.

(Continued)

*Primary Examiner* — Jack Chiang
*Assistant Examiner* — Brandon Bowers
(74) *Attorney, Agent, or Firm* — Dana Legal Services

(57) ABSTRACT

A tool makes modifications to the chip floorplan and the network-on-chip (NoC) elements' position on the floorplan and updates the number and position of the pipeline elements in a pipeline stage automatically, resulting in fewer errors and higher productivity.

8 Claims, 5 Drawing Sheets

(56) References Cited

U.S. PATENT DOCUMENTS

| | | | |
|---|---|---|---|
| 5,761,078 A | 6/1998 | Fuller et al. | |
| 5,887,670 A | 3/1999 | Tabata et al. | |
| 5,903,886 A | 5/1999 | Heimlich et al. | |
| 5,983,277 A | 11/1999 | Heile et al. | |
| 6,002,857 A | 12/1999 | Ramachandran | |
| 6,134,705 A | 10/2000 | Pedersen et al. | |
| 6,145,117 A | 11/2000 | Eng | |
| 6,249,902 B1 | 6/2001 | Igusa et al. | |
| 6,321,363 B1 | 11/2001 | Huang et al. | |
| 6,360,356 B1 | 3/2002 | Eng | |
| 6,378,121 B2 | 4/2002 | Hiraga | |
| 6,421,321 B1 | 7/2002 | Sakagawa et al. | |
| 6,437,804 B1 | 8/2002 | Ibe et al. | |
| 6,449,761 B1 | 9/2002 | Greidinger et al. | |
| 6,622,225 B1 | 9/2003 | Kessler et al. | |
| 6,883,455 B2 | 4/2005 | Maeda et al. | |
| 6,907,591 B1 | 6/2005 | Teig et al. | |
| 7,096,436 B2 | 8/2006 | Bednar et al. | |
| 7,398,497 B2 | 7/2008 | Sato et al. | |
| 7,587,687 B2 | 9/2009 | Watanabe et al. | |
| 7,788,625 B1 | 8/2010 | Donlin et al. | |
| 8,042,087 B2 | 10/2011 | Murali et al. | |
| 8,302,041 B1 | 10/2012 | Chan et al. | |
| 8,819,611 B2 | 8/2014 | Philip et al. | |
| 9,184,998 B2 | 11/2015 | Xue | |
| 9,262,359 B1* | 2/2016 | Noice | G06F 30/30 |
| 9,444,702 B1 | 9/2016 | Raponi et al. | |
| 9,569,574 B1 | 2/2017 | Khan et al. | |
| 9,792,397 B1 | 10/2017 | Nagaraja | |
| 9,825,779 B2 | 11/2017 | Ruymbeke et al. | |
| 9,836,568 B1* | 12/2017 | Ganusov | G06F 30/398 |
| 9,940,423 B2 | 4/2018 | Lescure | |
| 10,068,047 B1 | 9/2018 | Finn | |
| 10,282,502 B1 | 5/2019 | BShara et al. | |
| 10,348,563 B2 | 7/2019 | Rao et al. | |
| 10,387,594 B1* | 8/2019 | Dash | G06F 30/392 |
| 10,460,062 B2 | 10/2019 | Feld et al. | |
| 10,733,350 B1 | 8/2020 | Prasad et al. | |
| 10,853,545 B1 | 12/2020 | Nardi et al. | |
| 10,922,471 B2 | 2/2021 | Baeckler et al. | |
| 10,990,724 B1 | 4/2021 | Cherif et al. | |
| 11,121,933 B2 | 9/2021 | Cherif et al. | |
| 11,281,827 B1 | 3/2022 | Labib et al. | |
| 11,449,655 B2 | 9/2022 | Cherif et al. | |
| 2003/0093765 A1 | 5/2003 | Lam et al. | |
| 2004/0040007 A1 | 2/2004 | Harn | |
| 2004/0230919 A1 | 11/2004 | Balasubramanian et al. | |
| 2005/0073316 A1 | 4/2005 | Graham | |
| 2005/0268258 A1 | 12/2005 | Decker | |
| 2007/0156378 A1 | 7/2007 | McNamara | |
| 2007/0157131 A1 | 7/2007 | Watanabe et al. | |
| 2007/0174795 A1 | 7/2007 | Lavagno et al. | |
| 2007/0186018 A1 | 8/2007 | Radulescu et al. | |
| 2008/0046854 A1 | 2/2008 | Tang | |
| 2008/0049753 A1 | 2/2008 | Heinze et al. | |
| 2008/0279183 A1 | 11/2008 | Wiley et al. | |
| 2008/0291826 A1 | 11/2008 | Licardie et al. | |
| 2009/0031277 A1 | 1/2009 | Mcelvain et al. | |
| 2009/0313592 A1 | 12/2009 | Murali et al. | |
| 2010/0061352 A1 | 3/2010 | Fasolo et al. | |
| 2010/0162189 A1 | 6/2010 | Lavagno et al. | |
| 2010/0218146 A1 | 8/2010 | Platzker et al. | |
| 2010/0274785 A1 | 10/2010 | Procopiuc et al. | |
| 2011/0170406 A1 | 7/2011 | Krishnaswamy | |
| 2012/0013509 A1 | 1/2012 | Wisherd et al. | |
| 2012/0311512 A1 | 12/2012 | Michel et al. | |
| 2013/0174113 A1 | 7/2013 | Lecler et al. | |
| 2013/0208598 A1 | 8/2013 | Nakaya et al. | |
| 2013/0258847 A1 | 10/2013 | Zhang et al. | |
| 2013/0283226 A1 | 10/2013 | Ho et al. | |
| 2014/0115218 A1 | 4/2014 | Philip et al. | |
| 2014/0126572 A1 | 5/2014 | Hutton et al. | |
| 2014/0153575 A1 | 6/2014 | Munoz | |
| 2014/0156826 A1 | 6/2014 | Chang et al. | |
| 2014/0160939 A1 | 6/2014 | Arad et al. | |
| 2014/0169173 A1 | 6/2014 | Naouri et al. | |
| 2014/0204735 A1 | 7/2014 | Kumar et al. | |
| 2014/0211622 A1 | 7/2014 | Kumar et al. | |
| 2014/0298281 A1 | 10/2014 | Varadarajan et al. | |
| 2014/0321839 A1 | 10/2014 | Armstrong | |
| 2015/0036536 A1 | 2/2015 | Kumar et al. | |
| 2015/0106778 A1 | 4/2015 | Mangano et al. | |
| 2015/0121319 A1 | 4/2015 | Hutton et al. | |
| 2015/0178435 A1 | 6/2015 | Kumar | |
| 2015/0254325 A1 | 9/2015 | Stringham | |
| 2015/0341224 A1 | 11/2015 | Van et al. | |
| 2015/0347641 A1 | 12/2015 | Gristede et al. | |
| 2016/0103943 A1 | 4/2016 | Xia et al. | |
| 2016/0275213 A1 | 9/2016 | Tomita | |
| 2016/0321390 A1 | 11/2016 | Bozman et al. | |
| 2017/0060204 A1 | 3/2017 | Gangwar et al. | |
| 2017/0063734 A1 | 3/2017 | Kumar | |
| 2017/0132350 A1 | 5/2017 | Janac | |
| 2017/0177778 A1 | 6/2017 | Lescure | |
| 2017/0193136 A1 | 7/2017 | Prasad et al. | |
| 2018/0115487 A1 | 4/2018 | Thubert et al. | |
| 2018/0144071 A1 | 5/2018 | Yu et al. | |
| 2018/0227180 A1 | 8/2018 | Rao et al. | |
| 2019/0012909 A1 | 1/2019 | Mintz | |
| 2019/0073440 A1 | 3/2019 | Farbiz et al. | |
| 2019/0205493 A1 | 7/2019 | Garibay et al. | |
| 2019/0246989 A1 | 8/2019 | Genov et al. | |
| 2019/0251227 A1 | 8/2019 | Fink | |
| 2019/0260504 A1 | 8/2019 | Philip et al. | |
| 2019/0363789 A1 | 11/2019 | Lee et al. | |
| 2020/0092230 A1 | 3/2020 | Schultz et al. | |
| 2020/0162335 A1 | 5/2020 | Chen et al. | |
| 2020/0234582 A1 | 7/2020 | Mintz | |
| 2020/0366607 A1 | 11/2020 | Kommula et al. | |
| 2021/0203557 A1 | 7/2021 | Cherif et al. | |
| 2021/0226887 A1 | 7/2021 | Mereddy | |
| 2021/0320869 A1 | 10/2021 | Bourai et al. | |
| 2021/0409284 A1 | 12/2021 | Cherif et al. | |
| 2022/0294704 A1 | 9/2022 | Lescure et al. | |

FOREIGN PATENT DOCUMENTS

| | | |
|---|---|---|
| CN | 113051215 A | 6/2021 |
| CN | 113055219 A | 6/2021 |
| DE | 102015014851 A1 | 5/2016 |
| EP | 3842987 A1 | 6/2021 |
| EP | 4024262 A1 | 7/2022 |
| EP | 4057179 A1 | 9/2022 |

OTHER PUBLICATIONS

Mariani R et al: "Fault-Robust Microcontrollers for Automotive Applications", On-Line Testing Symposium, 2006. IOLTS 2006. 12th IEEE International Como, Italy Jul. 10-12, 2006, Piscataway, NJ, USA,IEEE, Jul. 10, 2006 (Jul. 10, 2006), pp. 213-218, XP010928275, DOI: 10.1109/IOLTS.2006.38 ISBN: 978-0-7695-2620-1.

Anonymous: "Intel Hyperflex Architecture HighPerformance Design Handbook", Oct. 4, 2021 (Oct. 4, 2021), pp. 1-147, XP093063924, Retrieved from the Internet: URL:https://cdrdv2.intel.com/vl/dl/getContent/667078?fileName=sl0_hp_hb-683353-667078.pdf.

James C. Tiernan. 1970. An efficient search algorithm to find the elementary circuits of a graph. Commun. ACM 13, 12 (Dec. 1970), 722-726. https://doi.org/10.1145/362814.362819.

Ken Eguro et al: "Simultaneous Retiming and Placement for Pipelined Net lists", Proceedings of the 16th International Symposium on Field-Programmable Custom Computing Machines, Apr. 14, 2008 (Apr. 14, 2008), pp. 139-148, XP031379339.

Anonymous: "Network on a chip—Wikipedia", Jun. 15, 2021, https://en.wikipedia.org/w/index.php?title=Network_on_a_chip &oldid-1028654828.

Haytham Elmiligi et al: "Networks-on-chip topology optimization subject to power, delay, and reliability constraints", IEEE International Symposium on Circuits and Systems, May 30, 2010, pp. 2354-2357 DOI: 10.1109/ISCAS.2010.5537194.

(56) References Cited

OTHER PUBLICATIONS

Jain R. et al: "Predicting system-level area and delay for pipelined and nonpipelined designs", IEEE Transactions on Computer Aided Design of Integrated Circuits and Systems, vol. 11, No. 8, Jan. 1, 1992, pp. 955-965, DOI: 10.1109/43.149767.

Jingye Xu et al: "Latch Based Interconnect Pipelining for High Speed Integrated Circuits", Proceedings of the International Conference on Electro/Information Technology, May 1, 2006, pp. 295-300 DOI: 10.1109/EIT.2006.252152.

Jun Minje et al: "Exploiting Implementation Diversity and Partial Connection of Routers in Application-Specific Network-on-Chip Topology Synthesis", IEEE Transactions on Computers, IEEE, USA, vol. 63, No. 6, Jun. 1, 2014 (Jun. 1, 2014), pp. 1434-1445, XP011550397, ISSN: 0018-9340, DOI: 10.1109/TC.2012.294.

Saponara S et al: "Design and coverage-driven verification of a novel network-interface IP macrocell for network-on-chip interconnects", Microprocessors and Microsystems, vol. 35, No. 6 , pp. 579-592, XP028255708 ISSN: 0141-9331, DOI: 10.1016/J.MICPRO. 2011.06.005.

Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150 XP029678799, ISSN: 0141-9331, DOI: 10.1016/J.MICPRO. 2016.04.008.

Song Z et al: "A NoC-Based High Performance Deadlock Avoidance Routing Algorithm", Computer and Computational Sciences, 2008. IMSCCS '08, International Multisymposiums on, IEEE Piscataway, NJ, USA, Oct. 18, 2008, pp. 140-143, XP031411025, ISBN: 978-0-7695-3430-5.

U.S. Appl. No. 17/134,384, filed Dec. 26 2020, Frederico Angiolini.
U.S. Appl. No. 17/665,578, filed Feb. 6, 2022, K. Charles Janac.
"a distributed interleaving scheme for efficient access to wideIO dram memory", Seiculescu Ciprian, Benini Luca, De Micheli Giovanni, Codes+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conterence Alberto Ghiribaldi, Hervé Tatenguem Fankem, Federico Angiolini, Mikkel Stensgaard, Tobias Bjerregaard, Davide Bertozzi a Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

Alessandro Pinto et al, "System level design paradigms", ACM Transactions on Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.

Annual IEEE International SoC Conference Proceedings Mohammad reza Kakoee, Federico Angiolin, Srinivasan Murali, Antonio Pullini, Ciprian Seiculescu, and Luca Benini a Floorplan-aware Interactive Tool Flow for NoC Design and Synthesis pp. 1, 2, 4 2009 Belfast, Northern Ireland, UK.

Bo Huang et al, "Application-Specific Network-on-Chip synthesis with topology-aware floorplanning", Integrated Circuits and Systems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.

David Atienza et al, Network-on-Chip Design and Synthesis Outlook, Science Direct, Integration the VLSI, journal 41 (2008) 340-359.

Dumitriu Vet Al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI:10.1109/TVLSI.2008.2004592.

Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 *abstract* * p. 426-p. 429.

Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].

Jean-Jacques Lecler et al: Application driven network-on-chip architecture exploration & refinement for a complex SoC, Design Automation for Embedded Systems, vol. 15 no. 2, Apr. 7, 2011, DOI: 10.1007/S10617-011-9075-5.

K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).

Luca Benini: "Application specific Noc design", Design, Automation and Test in Europe, 2006, Date '06 : Mar. 6-10, 2006, [Munich, Germany; Proceedings] / [Sponsored By the European Design and Automation Association], IEEE, Piscataway, NJ, USA, Mar. 6, 2006 (Mar. 6, 2006), pp. 491-495, XP058393584, ISBN: 9783981080100.

Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.

Partha et al., Design, Synthesis, and Test of Networks on Chips, IEEE (Year: 2005).

Picornell Tomas Tompic@Gap.UPV.ES et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.

Srinivasan K et al, "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE, (Oct. 11, 2004), doi:10.1109/ICCD.2004.1347957, ISBN 978-0-7695-2231-9, pp. 422-429, XP010736641.

Srinivasan Murali et al: "Mapping and physical planning of networks-on-chip architectures with quality-of-service guarantees", Proceedings of the 2005 Asia and South Pacific Design Automation Conference, Jan. 18, 2005, DOI: 10.1145/1120725.1120737.

Tobias Bjerregaard et al: "A Router Architecture for Connection-Oriented Service Guarantees in the Mango Clockless Network-on-Chip", Proceedings of the IEEE Conference and Exhibition On Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th IEEE International Conference on Asic, Nov. 3, 2015, pp. 1-4, DOI: 10.1109/ASICON.2015.7516952.

* cited by examiner

SYNTHESIS OF A NETWORK-ON-CHIP (NoC) FOR INSERTION OF PIPELINE STAGES

CROSS REFERENCE TO RELATED APPLICATION

This application claims priority to U.S. Provisional Application Ser. No. 63/250,149 filed on Sep. 29, 2021 by Moez CHERIF et al. and titled SYSTEM AND METHOD FOR UPDATING A NETWORK-ON-CHIP (NOC) WITH DISTANCE SPANNING PIPELINES, the entire disclosure of which is incorporated herein by reference.

TECHNICAL FIELD

The present technology is in the field of system design tools, and more precisely, relates to transforming a networks-on-chip (NoC) topology using design tools.

BACKGROUND

Multiprocessor systems have been implemented in systems-on-chip (SoCs) that communicate through network-on-chip (NoC). The SoCs include instances of initiator intellectual properties (IPs) and target IPs. Transactions, in the form of packets, are sent from a master to one or more slaves using industry-standard protocols. A NoC is made by assembling network elements, such as network interface units, switches, adapters, buffers, and pipelines. The NoC uses an internal NoC transport protocol to communicate for the transmission of packets. Network interface units convert the protocol used by the attached IP unit (of the SoC) into the transport protocol used inside the NoC. Switches route flows of traffic between sources and destinations and perform arbitration. Adapters deal with various conversions between data width, clocks, and power domains. Buffers are used to store packets to deal with rate adaptation between fast senders and slow receivers or vice-versa. Pipeline elements are used to span long distances while maintaining a given frequency.

The number and precise functions of each network element depend on the NoC technology employed. The NoC elements are implemented on a chip as logic functions using digital logic. When the network-on-chip is implemented on a device, its various elements have a location on the device floorplan. The topology of the NoC includes a connection, such as an edge or link, between two elements, adapters, or switches. There are instances in which the connection may span a distance that needs to be modified. Therefore, what is needed is a tool that implements a method that analyzes all connections between the elements of a NoC in order to determine if the connections are too far apart based on the design constraints and automatically modify the topology in the floorplan by inserting stages as needed.

SUMMARY

In accordance with various embodiments and aspects of the invention, a tool is disclosed that analyzes all connections between the elements of a NoC in order to automatically modify the topology of the NoC. The tool inserts pipeline stages as needed. the tool implements a method that allows modifications to the chip floorplan (and to the position of the NoC elements in the floorplan) to address distances between elements. The tool then updates the number and position of the pipeline elements automatically, resulting in fewer errors and higher productivity/efficiency and provides the updated NoC topology to the designer/user.

BRIEF DESCRIPTION OF THE DRAWINGS

In order to understand the invention more fully, a reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through the use of the accompanying drawings.

DETAILED DESCRIPTION

Figure 1:
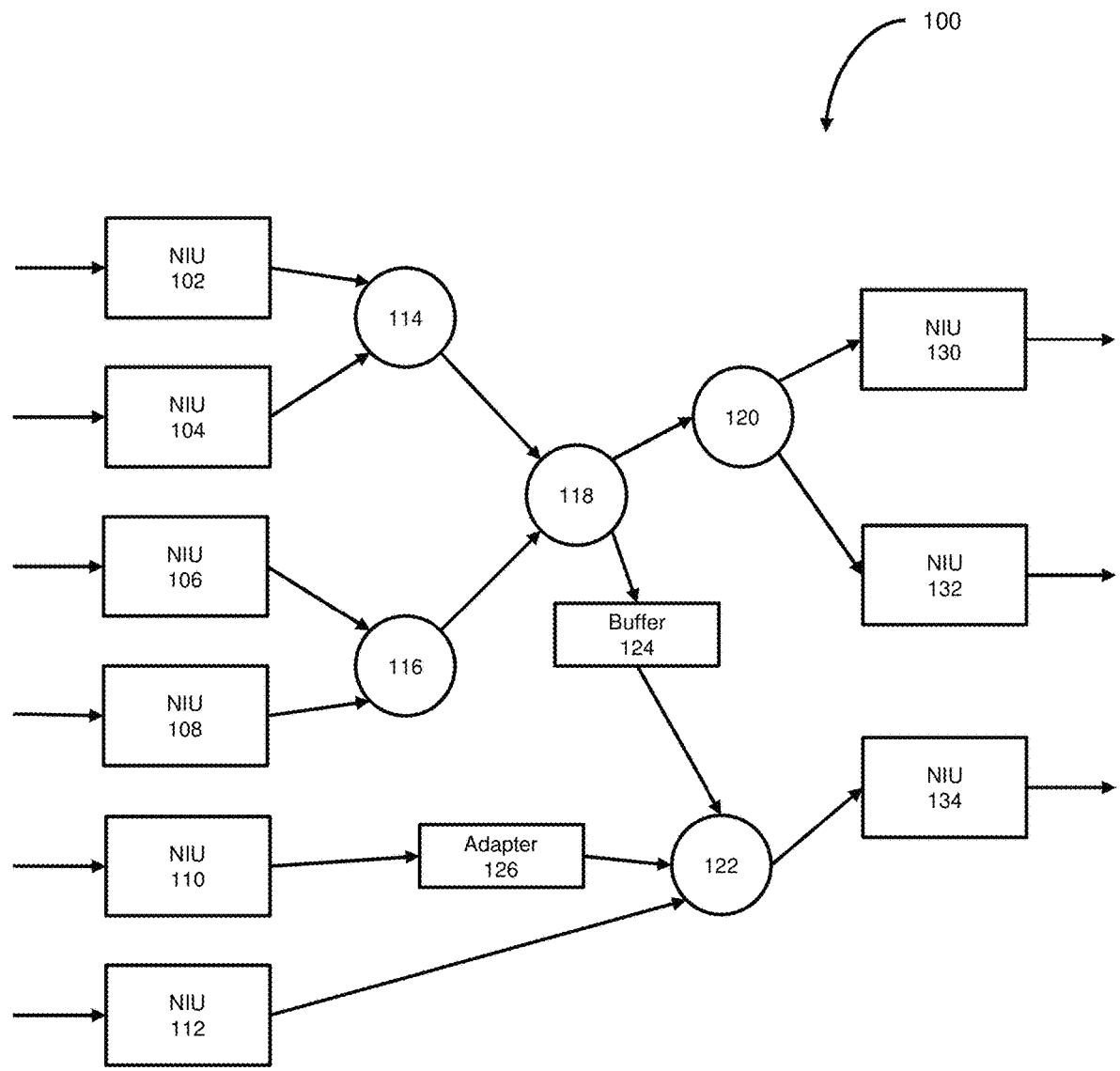
FIG. 1 shows a logical view of a network-on-chip (NoC) that is made by assembling various elements in accordance with various aspects and embodiments of the invention.

The following describes various examples of the present technology that illustrate various aspects and embodiments of the invention. Generally, examples can use the described aspects in any combination. All statements herein reciting principles, aspects, and embodiments, as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future.

As used herein, a "source" and an "initiator" refer to similar intellectual property (IP) modules or units and the terms are used interchangeably within the scope and embodiments of the invention. As used herein, a "sink" and a "target" refer to similar IP modules or units and the terms are used interchangeably within the scope and embodiments of the invention. As used herein, a transaction may be a request transaction or a response transaction. Examples of request transactions include write request and read request.

As used herein, a node is defined as a distribution point or a communication endpoint that is capable of creating, receiving, and/or transmitting information over a communication link, edge, path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

Referring now to FIG. 1, a network-on-chip (NoC) 100 is shown in accordance with various aspects and embodiments of the invention. The NoC 100 is one example of a network. In accordance with various aspects and embodiments of the invention, a network includes a set of nodes and set of links (also referred to as edges), each of these has a model and can be used at the heart of the synthesis to perform and implement transformation over the network (NoC) and converge to the best solution fitting the specified requirements. The NoC 100 includes nodes and endpoints and uses elementary network functions (elements) that are assembled, such as: network interface units (NIUs) 102, 104, 106, 108, 110, 112, 130, 132, and 134, nodes/switches 114, 116, 118, 120, and 122; adapters, such as adapter 126; and buffers, such as buffer 124. The NoC elementary network functions use an internal transport protocol, which is specific to the NoC 100, to communicate with each other, typically based on the transmission of packets. The NIUs convert the protocol used by the attached IP blocks of a system-on-chip (SoC) unit (not shown), into the transport protocol used inside the NoC 100. The switches route flows of traffic between source and destinations. The buffer 124 is used to insert pipelining elements in connections that span long distances, or to store packets to deal with rate adaptation between fast senders and slow receivers or vice-versa. The adapter 126 handles various conversions between data width, clock and power domains.

Figure 2:
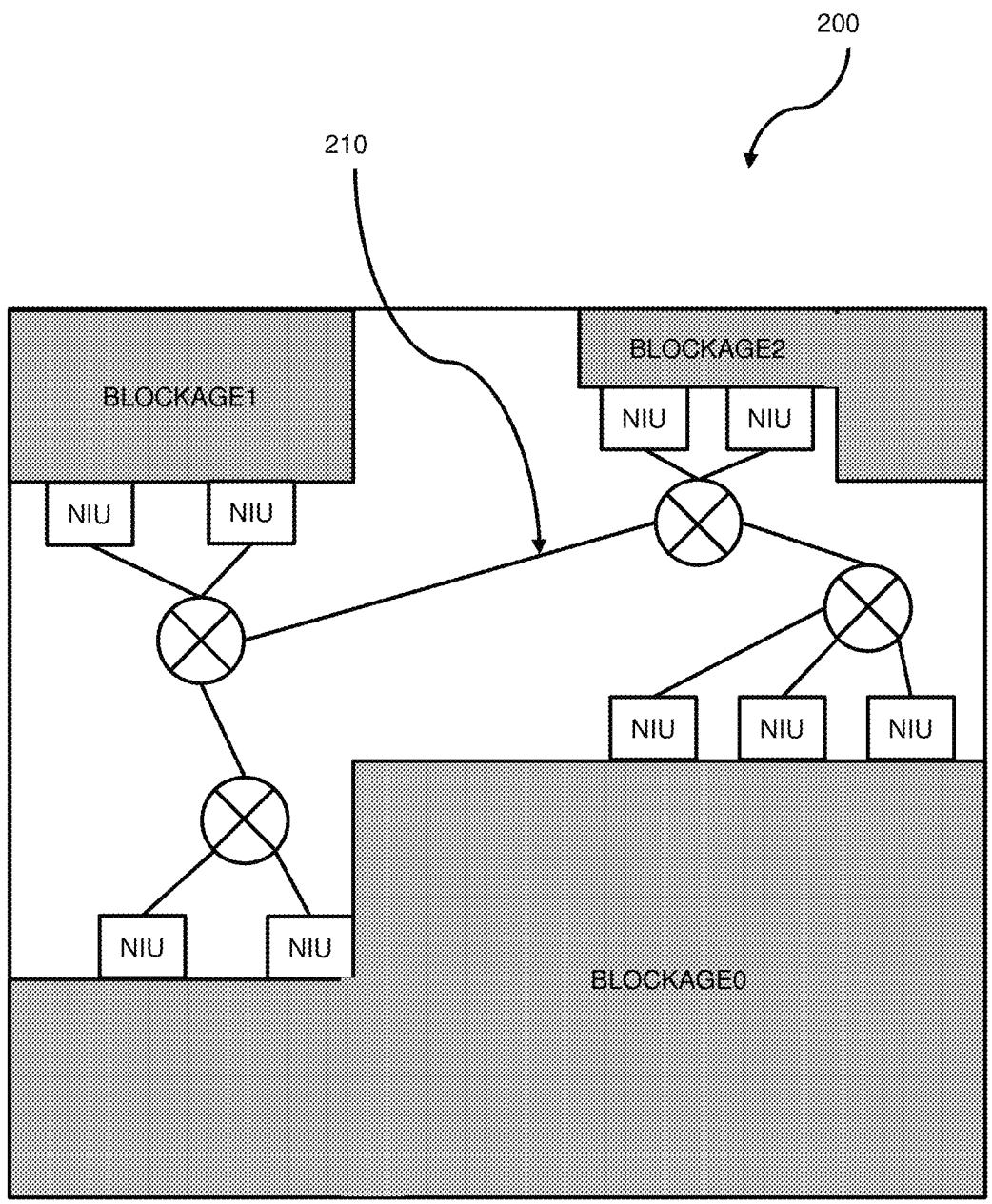
FIG. 2 shows a NoC with its elements placed on the floorplan in accordance with various aspects and embodiments of the invention.

Referring now the FIG. 2, a floorplan 200 includes a NoC and a description of the NoC is provided to a tool, for which the process will run. In accordance with various aspects and embodiments of the invention, the tool is made up of modules that handle different functions. The modules may reside on one system or be connected through a network and reside on multiple systems. In accordance with various aspects and embodiments of the invention, the tool includes an input means, such as a keyboard, a mouse or a touch screen. The tool also includes a means for providing information to a user, such as a graphical user interface or a display or a speaker. While the nodes shown are switches, in accordance with the various aspects and embodiments of the invention, the switches can be replaced with adapters. The adapters are used in instances where the clock domain between two endpoint changes or is different. The tool can apply the same analysis to any NoC element, including adapters.

The description that is provided to the tool includes performance constraints, performance requirements, configuration of elements, clock domain information that the elements are working with, and the position of each element on the floorplan 200. The description also includes connections between nodes, such as connection 210. The description also includes blockage areas (BLOCKAGE0, BLOCKAGE1, BLOCKAGE2) wherein NoC elements cannot be located or placed on the floorplan 200. Also, the average speed of the electric signal for the chosen silicon manufacturing technology is taken as another input. This value can be for instance, in picoseconds per millimeter; or any other metric that indicates a speed.

The NoC includes various elements, such as NIUs, switches, and blockage areas in the floorplan 200. The NoC includes various connectivity elements through various switches. In accordance with one aspect of the invention, a set of constraints are used as input to the tool, which is discussed in greater detail below. In accordance with some aspects of the invention, the tool executes a set of sub-steps and produces the description (synthesis) of a resulting NoC, such as the NoC shown in FIG. 3 and discussed below, with its configured elements and the position of each element on the floorplan 200. The generated description is used to actually implement the NoC hardware, using the physical information produced to provide guidance to the back-end implementation flow.

In accordance with some aspects of the invention, consider the non-limiting example of a working clock of 1 GHz, which is a period of 1000 picoseconds, and assuming a signal propagation speed of 500 ps per millimeter, if two connected elements are more than 1000/500=2 millimeters apart, the signal is taking too much time for the system to work properly, assuming synchronous digital logic implementation, and that the same clock is used by both connected units. In this case, the designer needs to insert, on the signal path or connection, such as connection 210 (or 506 of FIG. 5), one or more elements called "pipeline" that will contain registers (or flip-flops) and are intermediate stages for storing the signal value on their way to the destination, hereby enabling faster clock speed.

Figure 3:
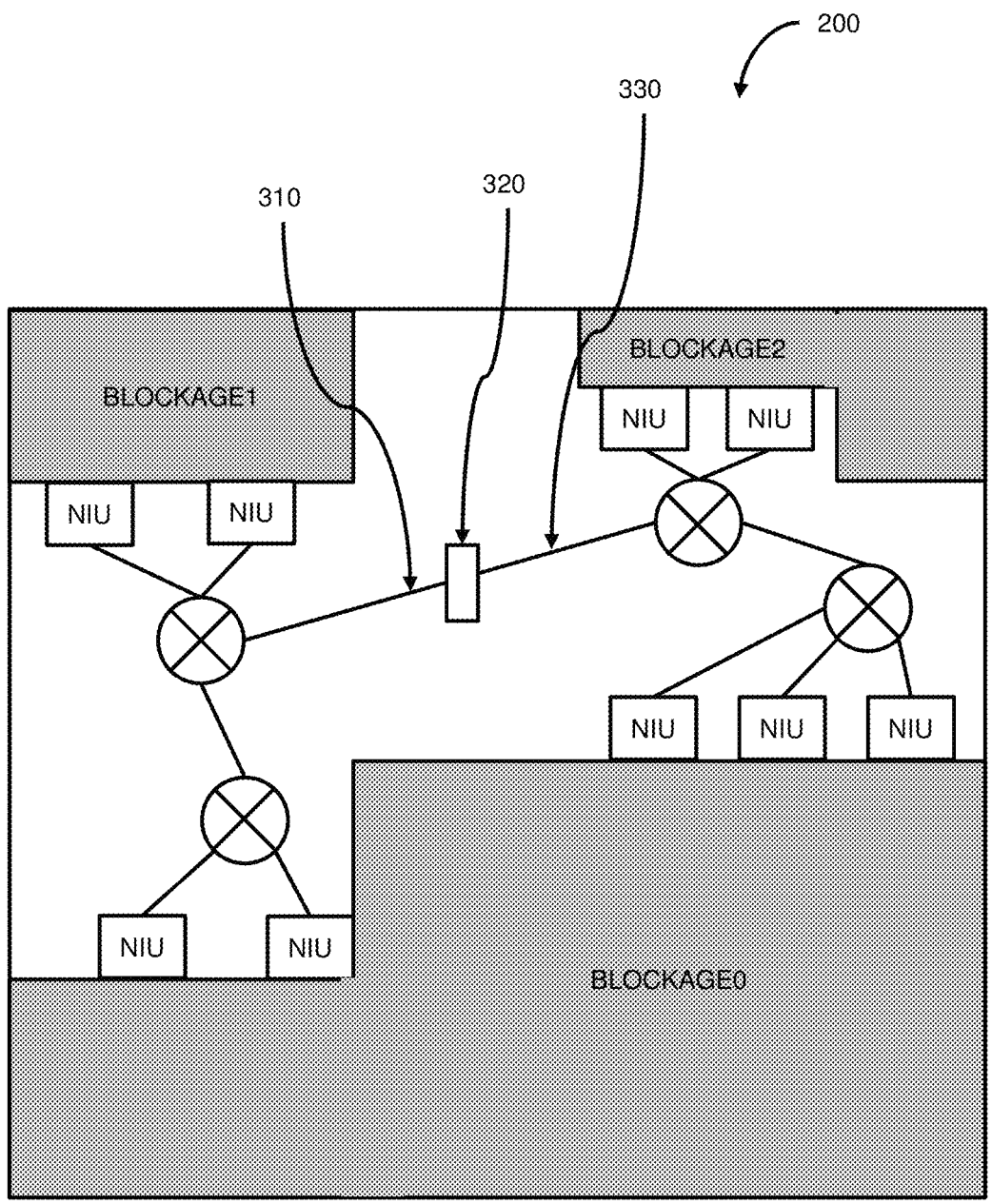
FIG. 3 shows the NoC of FIG. 2 modified by inserting a pipeline stage in accordance with various aspects and embodiments of the invention.

Referring now to FIG. 3, the floorplan 200 of FIG. 2 is shown with modifications to the connection 210 of FIG. 2. The tool examines or analyzes each connection (set of wires) between two NoC elements (nodes), such as the connection 210. The tool makes modifications as needed and examines all connections without pipeline stages or modification, thus, ignoring existing pipelines. In accordance with various aspects and embodiments of the invention, the tool assumes that all connections between NoC elements are synchronous: the clock used to launch the signal in the upstream element is the same as the clock used to capture the signal in the downstream element. Therefore, the connection itself can be seen as working at the frequency of that clock. The requirement for synchronous logic is that the signal should travel from the upstream element to the downstream element within or in less than one clock period. This is the requirement that the tool will honor and enforce for the connections between in the NoC elements. In accordance with some aspects and embodiments of the invention, the clock domain for two nodes of a connection may be different. In this example, adapters are used and the tool treats the adapters as nodes that handle the connection between two adapters by taking into account the clock domain on either side of the adapter.

For each connection, using the physical distance that separates the two elements, the clock of the upstream and downstream elements, and the average speed of the signal along the wires, the tool determines or calculates the number of clock cycles required to go from upstream to downstream. In accordance with various aspects and embodiments of the invention, the tool ignores any connection with an already existing pipeline element along the connection. The tool determines number of pipeline stage elements, if any, that is needed based on the number of clock cycles required for data to traverse or travel between elements or end points of a connection.

For example, the tool determines that connection 210 requires two clock cycles to travel upstream from one end point to the other end point. As such, there are not enough pipeline elements on the connection 210 because the data requires more clock cycles than the number of existing pipelines. Accordingly, the tool adds new pipeline element 320, which is created and added to the connection 210. The result is now a connection 310, a pipeline stage element 320, and connection 330. Each connection now can be traversed in one (or less) clock cycle.

As the tool examines a connection, if there are too many pipeline elements on a connection because it requires fewer clock cycles than the number of existing pipelines, then the tool removes excess pipelines from the route and connections are combined on either side of the pipeline stage element that is removed.

The tool processes all connections of the NoC, one by one, until all the connection from beginning of a route to the end of a route have been examined. At the end of the process, to tool prepares an updated the NoC description, which includes the modified pipeline elements that are inserted or removed.

Figure 4:
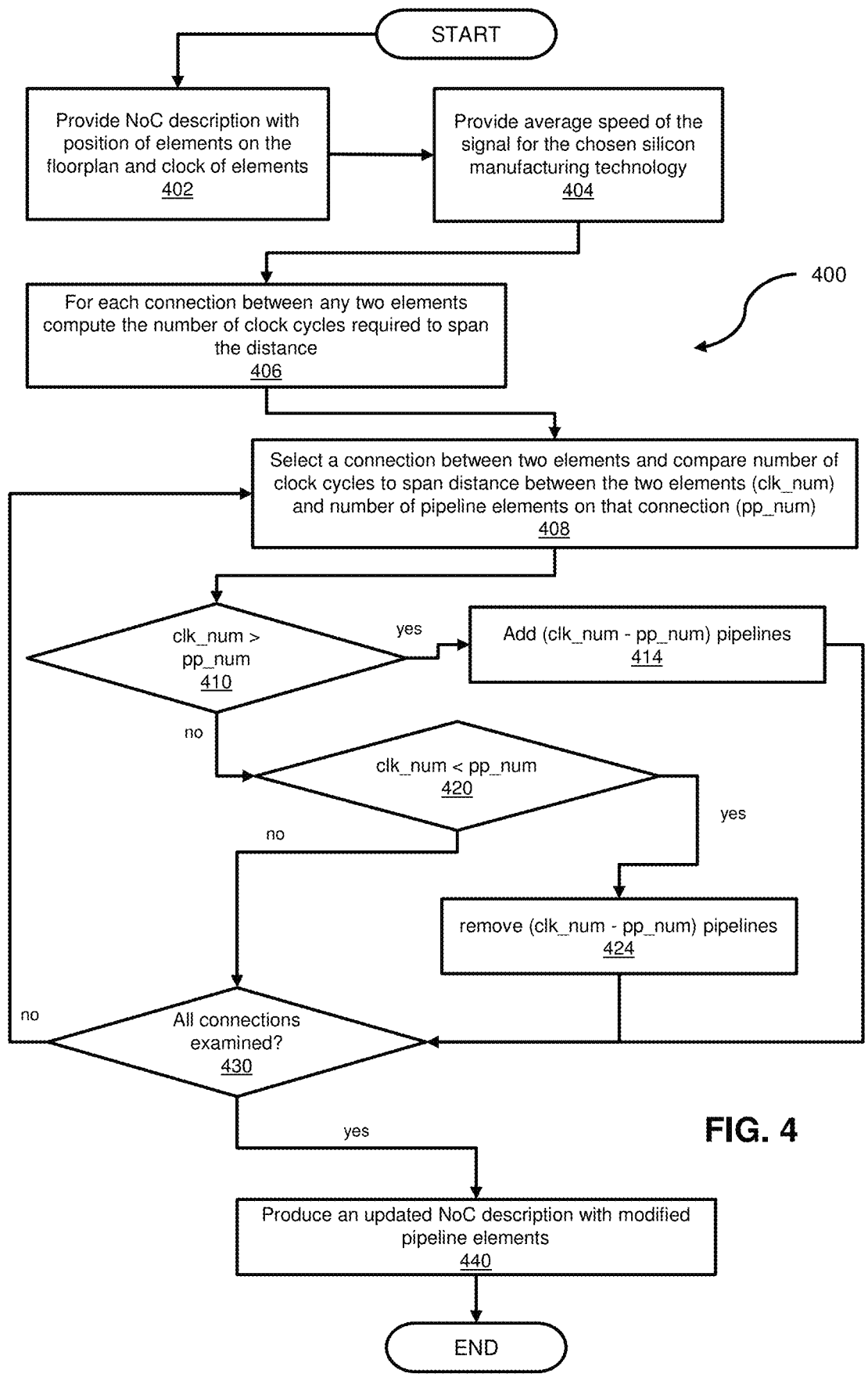
FIG. 4 shows a process executed by a tool for inserting pipeline stages in accordance with various aspects and embodiments of the invention.

Referring now to FIG. 4, the tool executes a process 400. At step 402, the tool receives, as input, a NoC description as outlined herein. The description includes the position of elements on the floorplan and the clock domain for each element. At step 404, the tool is provided with the average speed of signal propagation for a chosen silicon manufactured technology. The speed, as noted herein, may be in a measure value representation of performance speeds. As step 406, the tool computes the number of clock cycles required to span a connection (the distance) for each connection between any two elements. At step 408, the tool selects a connection between two elements. The tool compares the number of clock cycles (clk_num) needed to span the distance and the number of pipeline stages (pp_nm) on the connection.

At step 410, the tool determines if the number of number of clock cycles (clk_num) needed to span the distance is greater than one clock cycle and the number of pipeline stages (pp_nm), If so, then the tool proceeds to step 414 and automatically adds pipeline stages to the distance span to reduce the number clock cycles at for each segment to one or less clock cycles. In accordance with various aspects and embodiments of the invention, only one pipeline stage needs to be added. In accordance with various aspects and embodiments of the invention, more than one pipeline stage needs to be added. The tool then proceeds to step 430 noted below.

If at step 410 the tool determines that the number of clock cycles (clk_num) needed to span the distance is not greater than the number of pipeline stages (pp_nm), then the tool proceed to step 420. At step 420, the tool determines if number of clock cycles (clk_num) needed to span the distance is less the number of pipeline stages (pp_nm). If so, then the tool proceeds to step 424 and automatically removes pipeline stages. The tool then proceeds to step 430. If at step 420, the tool determines that the number of clock cycles (clk_num) needed to span the distance is not less than the number of pipeline stages (pp_nm), then the tool proceed to step 430.

At step 430, the tool determines if all connections have been examined. If so, then the tool proceeds to step 440 and generates or produces an updated NoC description with the modified pipeline stage element or pipeline elements. If at step 430 the tool determines that more connections need to be examined, then the tool proceeds to step 408 to select another connection for analysis.

Figure 5:
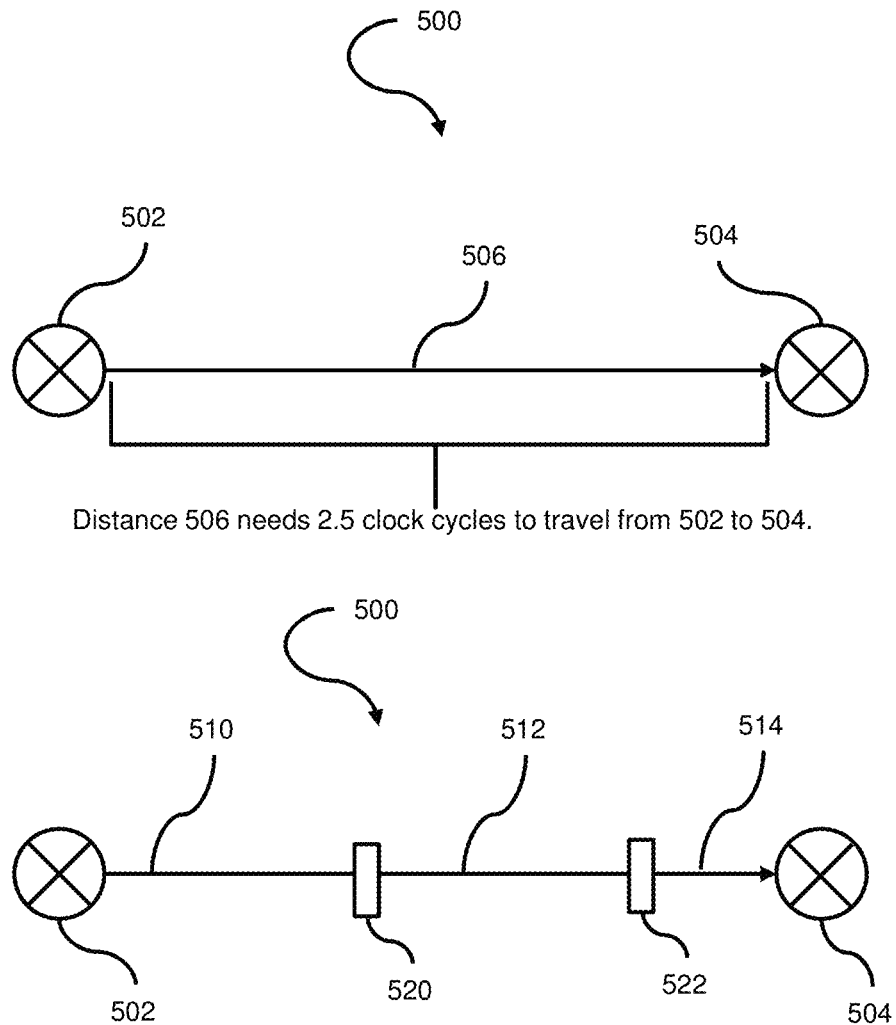
FIG. 5 shows multiple pipeline stages along a connection in accordance with various aspects and embodiments of the invention.

Referring now to FIG. 5, a portion of a route 500 includes elements 502 and 504 with a connection 506. Data (such as packets or transactions) traveling along route 500 takes 2.5 clock cycles to travel upstream from element 502 to 504 along connection 506. Thus, the tool identifies that there is a need to insert pipeline stages along the connection 506. In accordance with various aspects and embodiments of the invention, the tool determines a maximum distance (d-pipe) that corresponds to a distance that data can propagate in one clock cycle. The d-pipe distance is used along with the total distance of connection 506 between upstream and downstream elements to determine the number of pipeline stages needed. The tool takes total distance and divides it by the d-pipe distance to determine the number of pipeline stages needed. In accordance with various aspects and embodiments of the invention, the tool, after the determination, increases the number of pipeline stages needed by 1. For example and in another aspect and embodiment of the invention, d_pipe distance is calculated as the total distance between upstream and downstream elements divided by the number of pipelines needed plus 1. Then, starting from the upstream element, pipelines are placed along the connection, every d_pipe millimeter (or whatever unit d_pipe has been calculated into).

In accordance with various aspects and embodiments of the invention, starting from the upstream element 504, pipelines are placed along the connection every d-pipe distance millimeters (or whatever unit d-pipe has been calculated into). If a new pipeline element is added to a connection, the tool also produces a position for the new pipeline. The result is that the tool adds pipeline stages 520 and 522 and new connections 510, 512 and 514.

In accordance with various aspects and embodiments of the invention, starting from the downstream element 502, pipelines are placed along the connection 506 every d-pipe distance millimeters (or whatever unit d-pipe has been calculated into). If a new pipeline element is added to a connection, the tool also produces a position for the new pipeline. The result is that the tool adds pipeline stages 520 and 522 and new connections 510, 512 and 514. In accordance with various aspects and embodiments of the invention, the location of the pipeline element is dependent on the geographic layout of the floorplan and other elements on the floorplan, which allows the tool the ability to select and have flexibility in determining the location.

In one embodiment, the tool computes the position of the new pipelines works as follows: a distance between pipelines d-pipe (for example, in millimeters) equal to the distance traveled by the electric signal in one clock period is calculated. Then, starting from the upstream element, pipelines are placed along with the connection, every d-pipe millimeter (or whatever unit d-pipe has been calculated into).

In one embodiment, the tool computes the position of the new pipelines works as follows: a distance between pipelines d-pipe (for example, in millimeters) equal to the distance traveled by the electric signal in one clock period is calculated. Then, starting from the downstream element, pipelines are placed along with the connection, every d-pipe millimeter (or whatever unit d-pipe has been calculated into).

The benefit of this method is that it allows the designer to make modifications to the chip floorplan and to the position of the NoC elements on the floorplan, and then let a software update the number and position of the pipeline elements automatically, resulting in fewer errors, and higher productivity, compared to doing these operations manually.

In accordance with various aspects and embodiments of the invention, the tool produces a legal NoC by modifying the location of the network elements so that the network elements fit in the allocated free space (not the blockage areas) and do not overlap, and they exist in the corresponding clock and power domain limits. In accordance with various aspects of the invention, the area occupied on the die by each network element is computed using the information provided regarding the capabilities of the technology, such as the area of a reference logic gate. Then each element is tested for correctness of its placement (enough free space exists for the element, no other element overlaps). If the test fails, the element is moved until a suitable location is found where the test passes.

In accordance with other aspects of the invention, extension of clock and power domains on the floorplan are provided and each element is tested to ensure it is located within the bounds of the specified clock and power domain. If the test fails, the element is moved until a suitable location is found where the test is passing. Once a suitable placement has been found for each element, a routing is done of each connection between element. The routing process will find a suitable path for the set of wires making the connections between elements. After routing is done, distance-spanning pipeline elements are inserted on the links if required, using the information provided regarding the capabilities of the technology, based on how long it takes for a signal to cover a 1 mm distance.

In accordance with some aspects and embodiments of the invention, the tool generates one or more computer files describing the generated NoC that includes: 1) the list of network elements with their configuration: data width, clock domain; 2) the position of each generated network element on the floorplan; and 3) the set of routes through the network elements implementing the connectivity.

In accordance with the aspects of the invention, a route is an ordered list of network elements, one for each pair of (initiator, target) and one for each pair of (target, initiator). The route represents how traffic between the pairs will flow and through which elements.

In accordance with various aspects of the invention, the tool is used to generate metrics about the generated NoC, such as: histograms of wire length distribution, number of switches, histogram of switch by size.

In accordance with another aspect of the invention, the tool automatically inserts in the network various adapters and buffers. The tool inserts the adapters based on the adaptation required between two elements that have different data width, different clock and power domains. The tool inserts the buffers based on the scenarios and the detected rate mismatch.

In accordance with some aspects and embodiments, the tool can be used to ensure multiple iterations of the synthesis are done for incremental optimization of the NoC, which includes a situation when one constraint provided to the tool is information about the previous run.

After execution of the synthesis process by the software, the results are produced in a machine-readable form, such as computer files using a well-defined format to capture information. An example of such a format is XML, another example of such a format is JSON. The scope of the invention is not limited by the specific format.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A method comprising:
   taking as input a computer-readable description of a network-on-chip (NoC) comprising:
      a position of a plurality of NoC elements on a floorplan;
      a clock domain for every element; and
      an average speed of data propagation for a chosen silicon manufacturing technology wherein the floorplan is implemented;
   calculating, for a connection between two NoC elements selected from the plurality of NoC elements, a number of clock cycles required for data to travel between the NoC elements;
   comparing, for the connection between the two NoC elements, the number of clock cycles required to the number of pipelines already existing on the connection;
   adding a new pipeline element along the connection if the result of the comparison is that there are less pipeline stages on the connection than needed; and
   generating an updated NoC description.

2. The method of claim 1, wherein the step of generating includes producing an updated position for the pipeline elements when a new pipeline stage has been added to the connection.

3. The method of claim 2 further comprising producing an updated NoC position for the pipeline elements when a new pipeline stage has been added to the connection.

4. The method of claim 1, wherein the step of generating includes removing an existing pipeline element along the connection if the result of the comparison is that there are more pipeline stages on the connection than needed.

5. The method of claim 4 further comprising producing an updated NoC position for the pipeline elements when an existing pipeline has been removed from the connection.

6. A method for synthesis and generation of a network-on-chip (NoC) using a design tool, the method comprising:
   receiving a computer-readable description of the NoC, wherein the description includes element and connections between each element;
   receiving a plurality of physical constraints for the NoC;
   receiving a plurality of performance requirements for the NoC;
   generating, using the tool, an updated NoC description using the plurality of physical constraints and the plurality of performance requirements, wherein the plurality of performance requirements include clock cycle requirements, and adding at least one new pipeline element to produce a pipeline stage along at least one connection when data spanning along the at least one connection takes longer than one clock cycle, wherein the pipeline stage on the connection is needed to ensure a legal NoC description that satisfies the plurality of physical constraints and the plurality of performance requirements;
   adding one or more new pipeline elements along the at least one connection when more pipeline elements are needed along the at least one connection of the updated NoC description to satisfy clock cycles requirements; and
   generating a second updated NoC description to include the added one or more new pipeline elements.

7. The method of claim 6 wherein the plurality of performance requirements includes clock domain definitions.

8. A tool, which has a graphical user interface and an input means, for synthesis of a network-on-chip (NoC) topology, the tool comprising:
   a receiving module for taking a computer-readable description of a network-on-chip (NoC), wherein the computer-readable description includes:
      a position of NoC elements on a chip floorplan;
      a clock for every element that is working at a speed of the clock; and
      an average speed of an electric signal for a chosen silicon manufacturing technology as input;
   a calculation module for calculating a number of clock cycles required for the electric signal to travel between the two NoC elements for a connection between the two NoC elements;
   a comparison module for comparing the number of clock cycles required as calculated to the number of pipelines already existing on the connection between the two NoC elements;
   an adding module for adding a new pipeline element along the connection if the result of the comparison is that there are less pipelines on the connection than needed;
   a removing module for removing an existing pipeline element along with the connection if the result of the comparison is that there are more pipelines on the connection than needed; and
   a generator module for generating an updated position for the pipeline elements when a new pipeline has been added to the connection or an existing pipeline has been removed from the connection.

* * * * *